Jan. 15, 1963     H. THOMASON     3,073,035
GAUGE FOR CHECKING RELINED BRAKE SHOES
Filed Aug. 22, 1958     2 Sheets-Sheet 1
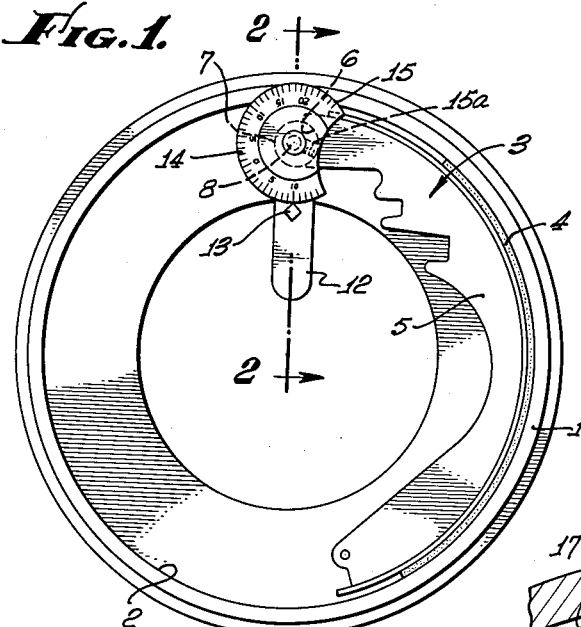
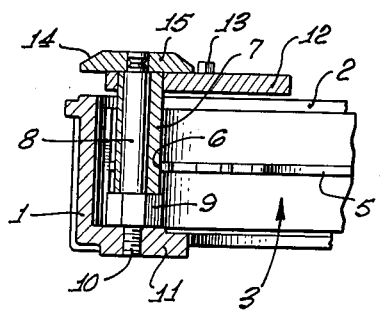
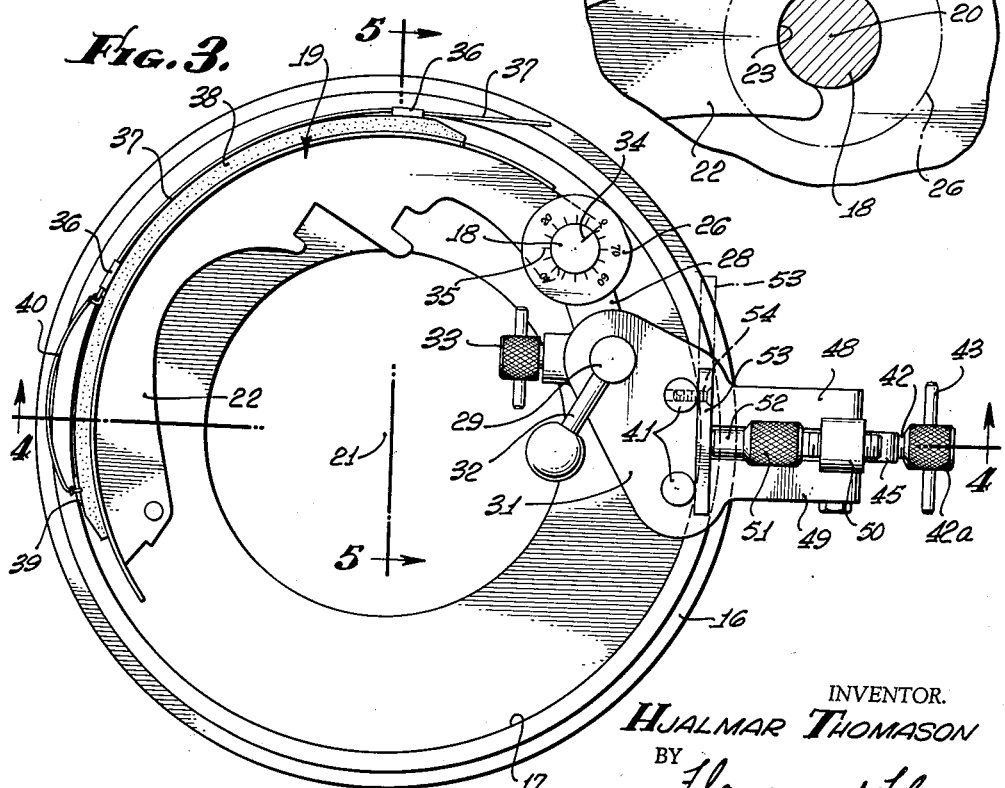
INVENTOR.
HJALMAR THOMASON
BY
Flam and Flam
ATTORNEYS.

Jan. 15, 1963
H. THOMASON
3,073,035
GAUGE FOR CHECKING RELINED BRAKE SHOES
Filed Aug. 22, 1958
2 Sheets-Sheet 2
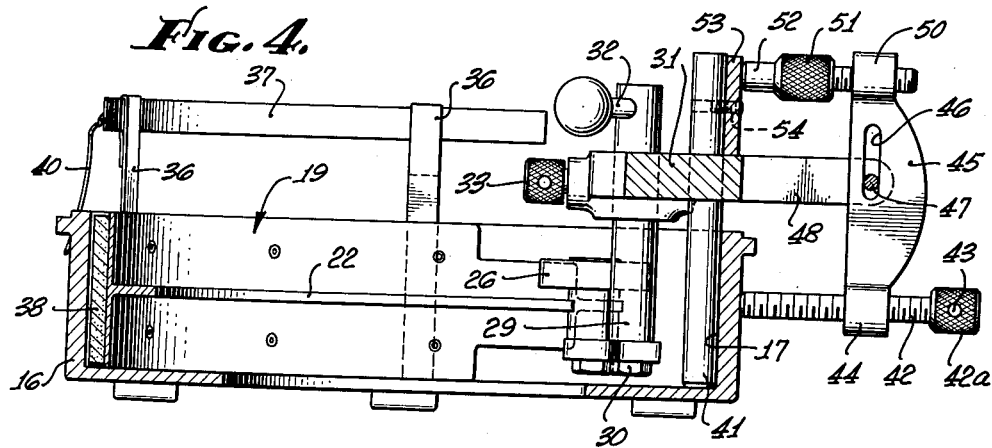
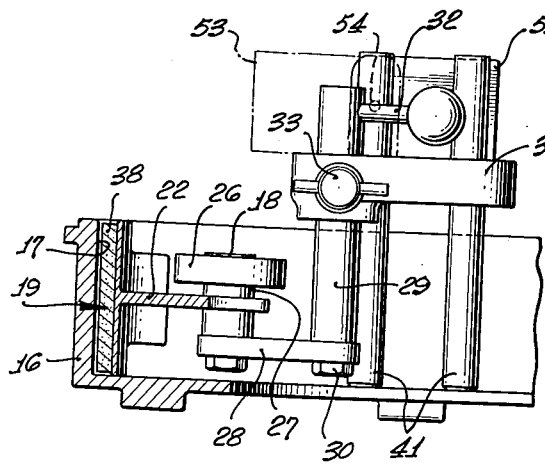
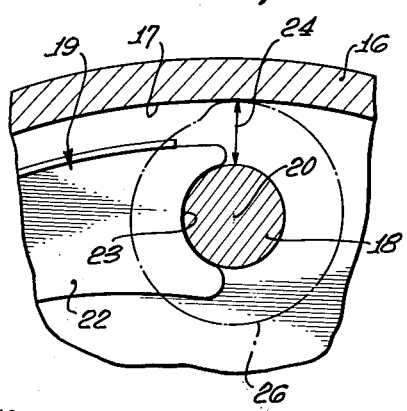
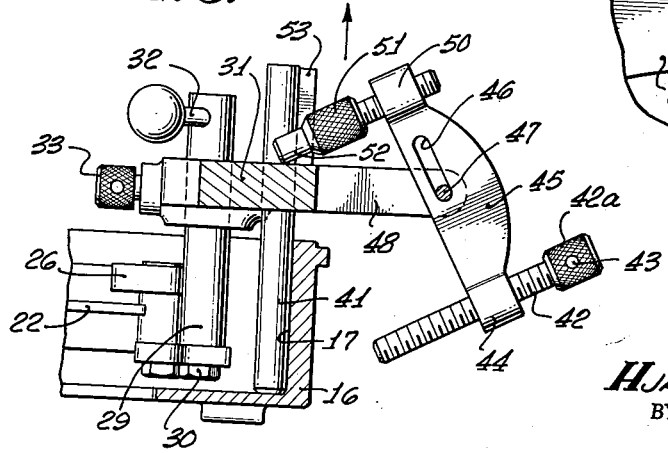
INVENTOR.
HJALMAR THOMASON
BY
Flam and Flam
ATTORNEYS.

United States Patent Office 3,073,035
Patented Jan. 15, 1963

3,073,035
GAUGE FOR CHECKING RELINED BRAKE SHOES
Hjalmar Thomason, 2023 W. Gage Ave.,
Los Angeles 47, Calif.
Filed Aug. 22, 1958, Ser. No. 756,667
12 Claims. (Cl. 33—180)

This invention relates to the grinding of relined automobile brake shoes. More particularly the invention relates to gauging apparatus for determining whether the relined shoes would accurately fit within the specific brake drums to which they belong.

It is almost universal practice in brake mechanisms to provide a pair of brake shoes each having a lining that has a cylindrical surface adapted to engage an internal cylindrical surface formed in a brake drum. The shoes are urged angularly about an anchor post usually arranged close to the internal cylindrical surface. It is now quite common to provide such anchor posts that are stationary. The relative position of the post with relation to the braking internal cylindrical surface of the drum is not uniform for all makes of brake structures.

Also, when the brake lining wears thin, it is necessary to provide new lining for the shoes, and to grind the outer periphery of the lining so as to fit the brake drum. If the renewal of the lining is too long delayed, the interior cylindrical surface of the drum may be scored, due to the contact between that surface and the exposed heads of the metal rivets holding the lining to the shoe. In the event of such scoring, the brake drum must be rebored or refinished as to present a substantially true, smooth cylindrical surface for engagement by the lining.

It is one of the objects of this invention to provide a gauge to test the accuracy of a newly lined brake shoe in cooperation with the drum and the anchor, irrespective of the particular location of the anchor or the exact finish diameter of the drum.

In a prior application filed in the name of the present applicant on November 3, 1955, under Serial No. 544,682, now Patent No. 2,939,254, entitled "Brake Shoe Grinding Equipment," the method of grinding the lining to provide an accurate fit with the brake drum is described. This application is a continuation-in-part of said prior application.

It is another object of this invention to provide a simple gauge apparatus to determine whether a brake shoe and its lining will correctly fit the drum for which it is intended. This gauging must take into account that brakes having the same diameter and construction may have the anchors located at different distances from the center of the brake assembly. Correct fitting must also take into account that brake shoes for fixed anchor brakes, because of error tolerance in anchor location, must be ground smaller in diameter in relation to the drum than the same shoes used in a brake assembly where the anchors are adjustable. Correct fitting must furthermore take into account that when brake drums have been turned oversize (because of scoring shoes) for a fixed anchor brake does not only have to be the correct amount oversize to properly fit the brake drum, but they must also be correctly fitted in relation to the anchor, so that when shoes are mounted on the brake assembly, they can be adjusted to obtain proper clearance between brake shoes and drum. It is accordingly another object of this invention to provide a gauge of this character that may be used for checking brake shoes and in cooperation with a grinder equipped with a shoe holding fixture, such as covered by patent application Serial No. 544,682, properly fit brake shoes to drums, standard or oversize, regardless of anchor location.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a plan view of a gauge structure incorporating the invention, shown in use in connection with a brake shoe and its lining;

FIG. 2 is a sectional view taken along a plane corresponding to line 2—2 of FIG. 1;

FIG. 3 is a view, similar to FIG. 1, of a modified form of the invention;

FIGS. 4 and 5 are sectional views taken along planes corresponding respectively to lines 4—4 and 5—5 of FIG. 3;

FIG. 6 is a fragmentary view similar to FIG. 4, showing the manner in which a detachable structure of the gauge may be readily attached and removed for cooperation with any of a plurality of elements having internal cylindrical surfaces such as brake drums or gauges simulating such drums; and FIGS. 7 and 8 are views, mainly diagrammatic, illustrating the manner of adjustment of the gauge.

In the form shown in FIGS. 1 and 2, a cup-like member 1 is indicated having an internal cylindrical surface 2. This cylindrical surface 2 is made to conform to a standard diameter of brake drums. Thus, there may be a number of devices such as member 1, having surfaces respectively corresponding to different sizes of brake drums.

A brake shoe 3 is also shown, carrying a brake lining 4. The external cylindrical surface of this brake lining is adapted to interfit the interior cylindrical surface 2, to determine whether it is correctly ground to cooperate with the brake drum and the anchor with which it is to be installed.

The central rib 5 of this brake shoe 3 is provided with an end recess 6 now commonly provided, for engaging with a stationary anchor, and about which it is adapted to move angularly.

In the present instance, this stationary anchor is simulated by a post 7 that has an eccentric bore. A pintle 8 forms a mounting for the post 7. This pintle 8 has a hexagonal portion 9, making it possible to tighten the terminal threaded end 10 of the pintle into a threaded aperture formed in the flange 11 of the cup-like member 1.

The member 7 is adapted to be angularly adjusted by the aid of an arm 12 carrying an index or pointer 13. This index or pointer cooperates with a scale 14 carried by a disk 15 fastened to the top of the pintle 8, as by set screw 15a.

By moving the arm 12, the post 7 may be caused to approach or recede from the inner cylindrical surface 2. In this way, it is possible to provide a relative positioning of the stationary post and the internal cylindrical surface to conform quite closely to the relative position of the anchor and the internal braking surface of a drum in which the shoe 3 is to be installed. The scale marks on the disk 15 may be spaced to indicate what adjustment should be made for any particular brake shoe, so that the post 7 assumes a position correctly corresponding to that brake mechanism, and also takes into account the recess location in the end of the webs of the various brake shoes.

When it is desired to use the gauging apparatus, the post 7 is angularly moved until the pointer 13 designates the specific desired location of the post to simulate the brake anchor. Then the finished brake shoe 3 is mounted within the gauge so that its recess 6 engages the external surface of the post 7. If there is a relatively close fit between substantially the entire convex surface of the lining 4 and the internal surface 2 of the cup-like member 1, then the brake shoe has been correctly ground.

In the form shown in FIGS. 3 to 8, inclusive, a refinement of the mechanism illustrated in FIGS. 1 and 2 is illustrated.

A brake drum 16 having a finished interior cylindrical surface 17 is shown. The gauge structure embodying the invention is so arranged that it may be used with any size of drum.

As shown most clearly in FIGS. 5, 7 and 8, a post 18 simulating the stationary anchor for a brake shoe 19 is shown as having an axis 20 parallel to the axis 21 of the cylindrical surface 17. The brake shoe 19 has a rib 22 in which there is an end recess 23 adapted to engage a stationary anchor. It is furthermore shown as carrying the brake lining 38. In the position shown in FIGS. 7 and 8, the recess 23 is in accurate contact with the post 18.

When the brake drum 16 has a diameter larger than the standard size, the axis 20 of the anchor-simulating post 18 must be moved radially inwardly of the member 16, so that the dimension illustrated by the line 24 in FIG. 7 is a maximum. In FIG. 8 a minimum dimension 25 is indicated.

In order accurately to adjust the position of the axis 20, the post 18 has mounted therein a cam 26 shown in phantom lines in FIGS. 7 and 8. This cam 26 is telescoped over the upper end of the post 18 and is limited in its downward movement by the aid of a pin 27 (FIG. 5), mounted radially in post 18.

Since the anchor location with respect to the axis of a drum is not the same for different drums, there are a plurality of cam gauges 26 capable of cooperating with post 18, each corresponding to a definite distance between the anchor axis and surface 17.

Post 18 is mounted on an arm 28. This arm is rigidly fastened to the lower end of a shaft 29 as by the aid of a cap screw 30. Shaft 29 is angularly adjustable in a bracket or mounting structure 31 which is fixed to the flange of the member 16, as hereinafter described. At the upper end of the shaft 29, there is a handle 32 for angularly moving the shaft. Such movement of the shaft causes the periphery of the cam structure 26 to move into or out of engagement with the cylindrical surface 17. A digitally manipulatable set screw 33 intersects the bore for the shaft 29 and is intended to maintain the shaft 29 in angularly adjusted position.

The contour of the cam 26 is apparent from a consideration of FIGS. 7 and 8. In FIG. 7 the crest of the cam is in contact with the internal cylindrical surface 17.

To adjust the cam 26 between these two positions, use is made of an index or pointer 34 (FIG. 3) marked on the top of the post 18. This index or pointer cooperates with the graduations 35 inscribed on the upper face of the cam 26. Thus by rotating the cam about the axis of post 18, compensation for any oversize drum is readily effected. When the pointer corresponds to zero, the post 27 has a position corresponding to the anchor position to be used with the specific type of brake drum. The graduation marks correspond in thousandths of an inch oversize of the drum being gauged. In some instances, minus graduations as well as plus graduations may be used, to make possible the gauging of shoes in undersized drums.

In order to use the apparatus in oversize drums, the cam 26 is first angularly adjusted on post 18 to comply with the oversize diameter of the drum to be fitted with the brake shoe 19. Then the set screw 33 is released to make it possible for the arm 28 to be moved by manipulation of the handle 32. After it is swung outwardly, the set screw 33 is tightened. Then the recess 23 in rib 22 of the shoe 19 is placed in contact with the periphery of the adjusted position of post 18, and the brake shoe 19 brought close to the surface 17. After such setting, the cam 26 can be removed. To facilitate removal, the cam is turned so as to be out of contact with surface 17.

As shown in FIGS. 3 and 4, a pair of thickness gauges 36 are slidably mounted on a thin flexible metal support 37. They are intended to be interposed between the lining 38 and the drum surface 17. These guages 36 are slidably mounted on the support 37 by the formation of flat loops on the upper ends of these guages. A third thickness guage 39 (FIG. 3) may be joined by a flexible chain or member 40 to support 37.

These thickness gauges correspond to the desired clearance to be maintained between the cooperating braking surfaces, when the brake are inactive.

In use, the thickness gauges 36 are first placed into contact with the internal cylindrical surface 17. Then the brake shoe 19 is angularly moved about the axis 20 of the post 18 until the thickness gauges stop this angular motion. Then the third thickness gauge 39 is used to determine whether the end portion of the lining 38 also has a clearance corresponding to the thickness of the gauge 39. If it does conform, the lining 38 has been properly ground.

In the event the anchor affixed to a specific brake drum is misplaced so as to be at a greater radial distance from the axis of the drum than required, there should be a compensation for this in gauging the brake shoe. Let us assume that a drum is .040 inch oversize, and the anchor as measured is .010 inch too far from center. The diameter of the drum is then $d+.040$ inch where $d$ is the standard size. The radius on which the axis of the anchor falls is $a+.010$ inch, where $a$ is the true distance from the drum axis to the anchor axis. The diameter upon which the misplaced anchor falls is twice this, or $2a+.020$ inch. The distance between the anchor axis and surface 17 is accordingly the difference between these two amounts, or $d-2a+.020$ inch. It is clear from this that cam 26 to obtain proper gauging must be moved so that line 34 coincides with mark 20 on the scale 35, as if the drum were only .020 inch oversize.

For other values of oversize drums and mislocated anchors, similar adjustments may be made.

The bracket 31 is readily detachable from the cup-like member 16 so that it may be used with any one of a number of brake drums such as 16, but having internal diameters of different values. By the aid of the present invention, the manipulation of the clamp for the bracket structure 31 is simplified and rendered quite rapid.

Thus, tightly affixed to the bracket structure 31 is a pair of spaced parallel cylindrical pins 41 which cooperate with the internal cylindrical surface 17 to provide one element of a clamping structure. These pins 41 form abutments having axes parallel with the axis of the cylindrical surface 17, so that one element of each cylindrical surface formed on the pins 41 may be placed in contact with the surface 17. Holding these pins tightly against surface 17, there is a clamping screw 42 which is intended to engage the outer flange of the member 16. This clamp screw has an axis transverse to the axes of the pins 14 and intermediate these two posts.

The clamp screw 42 has a knurled head 42a. This head has a transverse pin 43 to facilitate tightening and loosening of the clamp screw 42.

The screw 42 extends through a threaded aperture in an arm 44 of a yoke 45. This yoke has a slot 46 cooperating with a transverse pin 47. This pin 47 extends across the projections 48 and 49 which form a bifurcated arm formed integrally on the bracket structure 31. The spacing between the projections 48 and 49 provides a clearance space corresponding to the thickness of the yoke 45.

The upper part of the yoke 45 forms an arm 50, in which there is a threaded aperture for an adjustable screw 51. This adjustable screw has a left-hand end 52

(FIG. 4) adapted to contact a plate 53. This plate 53 abuts the pins or abutments 41 and is restrained against inward movement by these pins. This plate 53 serves as a restraint against inward motion of the screw 51; and consequently an angular movement of the yoke 45, as the clamp screw 42 is tightened. The plate 53 may be quickly detached from its operative position by a pivotal connection with one of the pins 41. Thus a screw 54 may operate as a pivot for the plate 53. In FIGS. 3 and 5 the inactive position of this plate 53 is indicated in phantom line.

In the position of FIG. 6, the plate 53 has been swung outwardly to remove the restraint against angular movement of this yoke 45. The plate 53 is released from pressure exerted by screw 51 after only a slight unclamping movement of the screw 42. Due to the slot-and-pin connection between the yoke 45 and the arms 48 and 49, the yoke 45 can then be swung in a counterclockwise direction completely to release the lead screw 42 and enable the entire bracket structure to be lifted out of the cuplike member 16. This angular movement of the yoke 45 is permitted whenever the plate 53 is swung to the inactive position illustrated in FIGS. 3 and 5.

The installation of the bracket 31 and its cooperating clamping elements within a selected drum 16 can also be easily effected. Thus, the pins 41 may be placed into contact with the cylindrical surface 17 while the clamp screw 42 is in the position of FIG. 6. Then the yoke 45 is turned clockwise until the clamp screw 42 contacts the cup-like member 16. In this position, the plate 53 can be swung back into the active position of FIGS. 3 and 4, and the clamp screw 42 tightened.

The inventor claims:

1. In a brake shoe gauge: a gauge member having at least a portion of complete interior cylindrical surface corresponding to the internal diameter of a brake drum, said surface having an axis; a member simulating the anchor for a brake shoe; mounting means for said anchor simulating member for securing said anchor simulating member spaced from but substantially parallel to the surface axis; said anchor simulating member having an operating portion within the complete cylindrical space at least partially defined by said interior cylindrical surface, whereby the exterior convex surface of the brake shoe may be opposed to said cylindrical surface; said interior cylindrical surface being open at one end for insertion of the brake shoe therein; said anchor simulating member also being freely accessible at said open end for placement and removal of the brake shoe relative both to said interior cylindrical surface and said anchor simulating member without requiring separation of said anchor simulating member and said gauge member; and means for adjusting the member on its mounting means for varying the eccentricity of said anchor simulating member.

2. In a brake shoe gauge: means forming an internal cylindrical surface corresponding to the internal diameter of a brake shoe drum; a bracket having projecting parallel abutments adapted to engage said surface; means detachably clamping said abutments against said surface; an arm mounted on the bracket and angularly adjustable about an axis parallel to the axis of the surface; a post carried by the free end of the arm; and a cam carried by the post and engageable with the surface upon angular movement of the arm; said cam being angularly adjustable with respect to the post for determining the separation of the post from the surface.

3. In a brake shoe gauge: means forming an internal cylindrical surface corresponding to the internal diameter of a brake shoe drum or its equivalent; a bracket having projecting parallel aboutments adapted to engage said surface; means detachably clamping said abutments against said surface; an arm mounted on the bracket and angularly adjustable about an axis parallel to the axis of the surface; a post carried by the free end of the arm; and a cam carried by the post and engageable with the surface upon angular movement of the arm; said cam being angularly adjustable with respect to the post for determining the separation of the post from the surface; and means for clamping said arm in adjusted position.

4. In combination: a bracket; means forming a clamping surface, and depending from the bracket; said bracket having an arm; a yoke having a slot-and-pin connection with the arm; a clamping screw carried by one end of the yoke; an abutment carried by the other end of the yoke; and a removable force-transmitting member between the abutment and the bracket so as to fix the said one end of the yoke and to make it possible to exert a clamping pressure by the screw against an object held between the screw and the means that forms the clamping surface.

5. The combination as set forth in claim 4, in which the force-transmitting member is a plate pivotally carried by the bracket and adapted to extend across an open space.

6. In combination: a bracket; a pair of pins passing through the bracket so as to extend on either side of it; said bracket having a bifurcated arm; another pin transverse to the pair of pins and extending between the bifurcations of the arm; a yoke having a slot in which said other pin is accommodated; an adjustable screw carried by one end of the yoke and having an axis intermediate the pair of pins; a force-transmitting member between the pair of pins and the screw; said member being pivotally mounted on one of the pair of pins to remove the member from the path of the screw; and a clamping screw carried by the other end of the yoke and transverse to the pair of pins, for exerting a clamping pressure against an object held between the clamping screw and the pair of pins.

7. In combination: a bracket; a pair of pins passing through the bracket so as to extend on either side of it: said bracket having a bifurcated arm; another pin transverse to the pair of pins and extending between the bifurcations of the arm; a yoke having a slot in which the other pin is accommodated; an adjustable screw carried by one end of the yoke and having an axis intermediate the pair of pins; a force-transmitting member between the pair of pins and the screw; said member being pivotally mounted on one of the pair of pins to remove the member from the path of the screw; a clamping screw carried by the other end of the yoke and transverse to the pair of pins, for exerting a clamping pressure against an object held between the clamping screw and the pair of pins; an arm pivotally mounted on the bracket; a post simulating a brake shoe anchor mounted on the arm; and an angularly adjustable cam mounted on the post.

8. In a gauge for lined brake shoes: support means having provisions for detachably mounting the support means on the edge of a drum structure; an arm mounted on the support means for movement in a path fixed with respect to the support means; and a cam gauge carried by the arm so as to move the cam gauge toward and from the drum interior.

9. The combination as set forth in claim 1, in which the adjusting means includes a pintle upon which the anchor-simulating member is rotatable, and which has an axis eccentric to the axis of the member.

10. The combination as set forth in claim 1 in which the adjusting means includes a cam mounted for angular adjustment about the axis of the member, and means for swinging the member with the cam so as to cause the cam to engage said cylindrical surface.

11. In a gauge: means forming an internal cylindrical surface, said surface having an axis; a cylindrical post having a bore eccentric to the post; a pintle fixed with respect to the surface forming means, and engaging the bore, said pintle having an axis parallel and adjacent to the axis of said surface: said pintle being located within the cylindrical space defined by said internal cylindrical surface; and means for angularly moving the post about the axis of the pintle.

12. In a brake shoe gauge: a gauge member having at least a portion of a complete interior cylindrical surface corresponding to the internal diameter of a brake drum, said surface having an axis; a member simulating the anchor for a brake shoe; and mounting means for said anchor simulating member for securing said anchor simulating member spaced from but substantially parallel to the surface axis; said anchor simulating member having an operating portion within the complete cylindrical space at least partially defined by said interior cylindrical surface, whereby the exterior convex surface of the brake shoe may be opposed to said cylindrical surface; said interior cylindrical surface being open at one end for insertion of the brake shoe therein; said anchor simulating member also being freely accessible at said open end for placement and removal of the brake shoe relative both to said interior cylindrical surface and said anchor simulating member without requiring separation of said anchor simulating member and said gauge member.

References Cited in the file of this patent
UNITED STATES PATENTS

| | | |
|---|---|---|
| 1,965,843 | Kuhle | July 10, 1934 |
| 2,124,603 | Barrett | July 26, 1938 |
| 2,241,728 | Loweke | May 13, 1941 |
| 2,268,171 | Sikora | Dec. 30, 1941 |
| 2,341,796 | Kuna | Feb. 15, 1944 |
| 2,545,784 | Kenner | Mar. 20, 1951 |
| 2,553,525 | Burke | May 15, 1951 |
| 2,614,333 | Peters | Oct. 21, 1952 |
| 2,738,589 | Jacob | Mar. 20, 1956 |
| 2,805,486 | Barrett | Sept. 10, 1957 |

FOREIGN PATENTS

| | | |
|---|---|---|
| 489,020 | Canada | Dec. 23, 1952 |